March 6, 1934.  J. F. LINDBERG  1,950,361
VENDING MACHINE
Filed Sept. 8, 1931    4 Sheets-Sheet 1
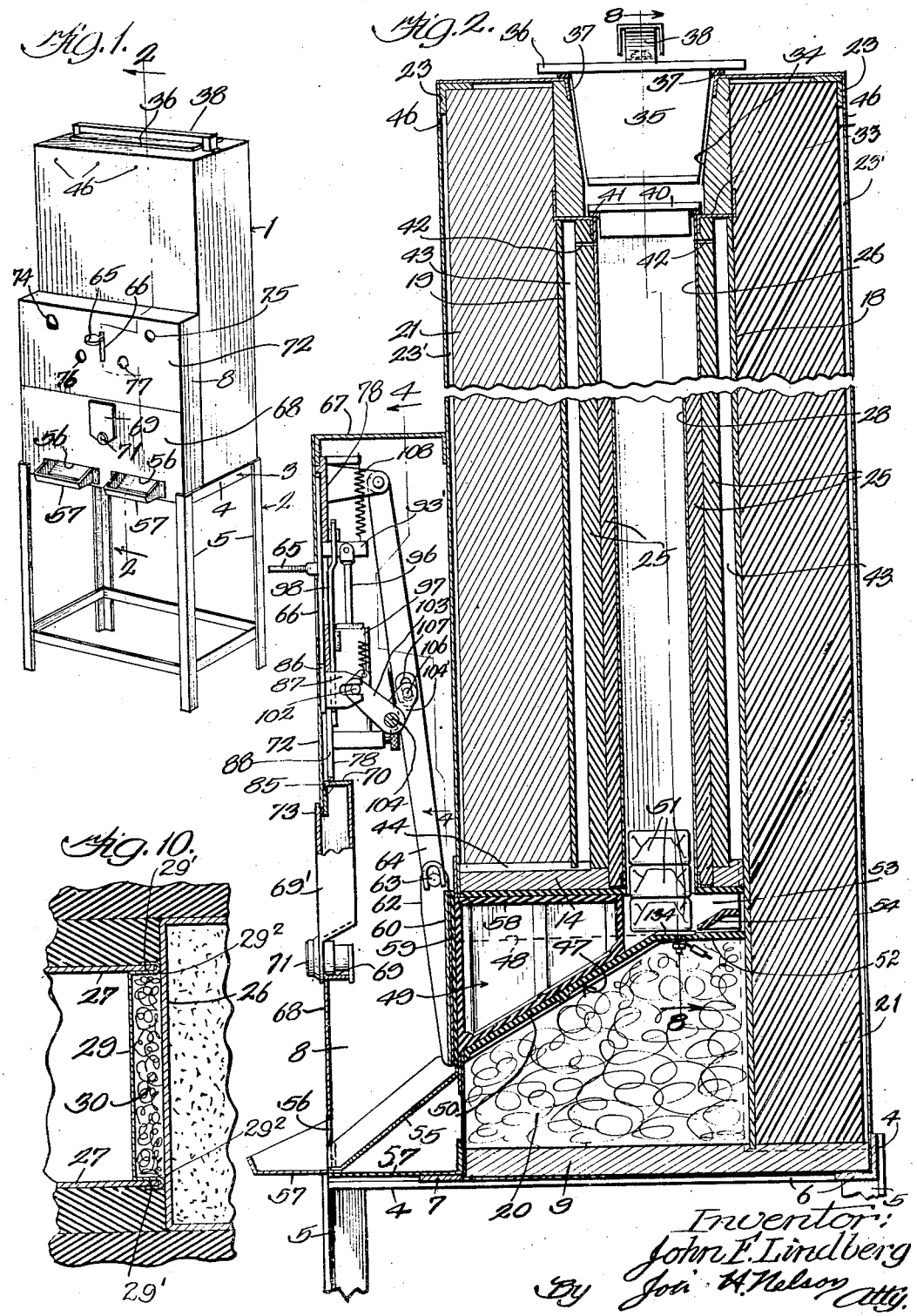

March 6, 1934. J. F. LINDBERG 1,950,361
VENDING MACHINE
Filed Sept. 8, 1931 4 Sheets-Sheet 2
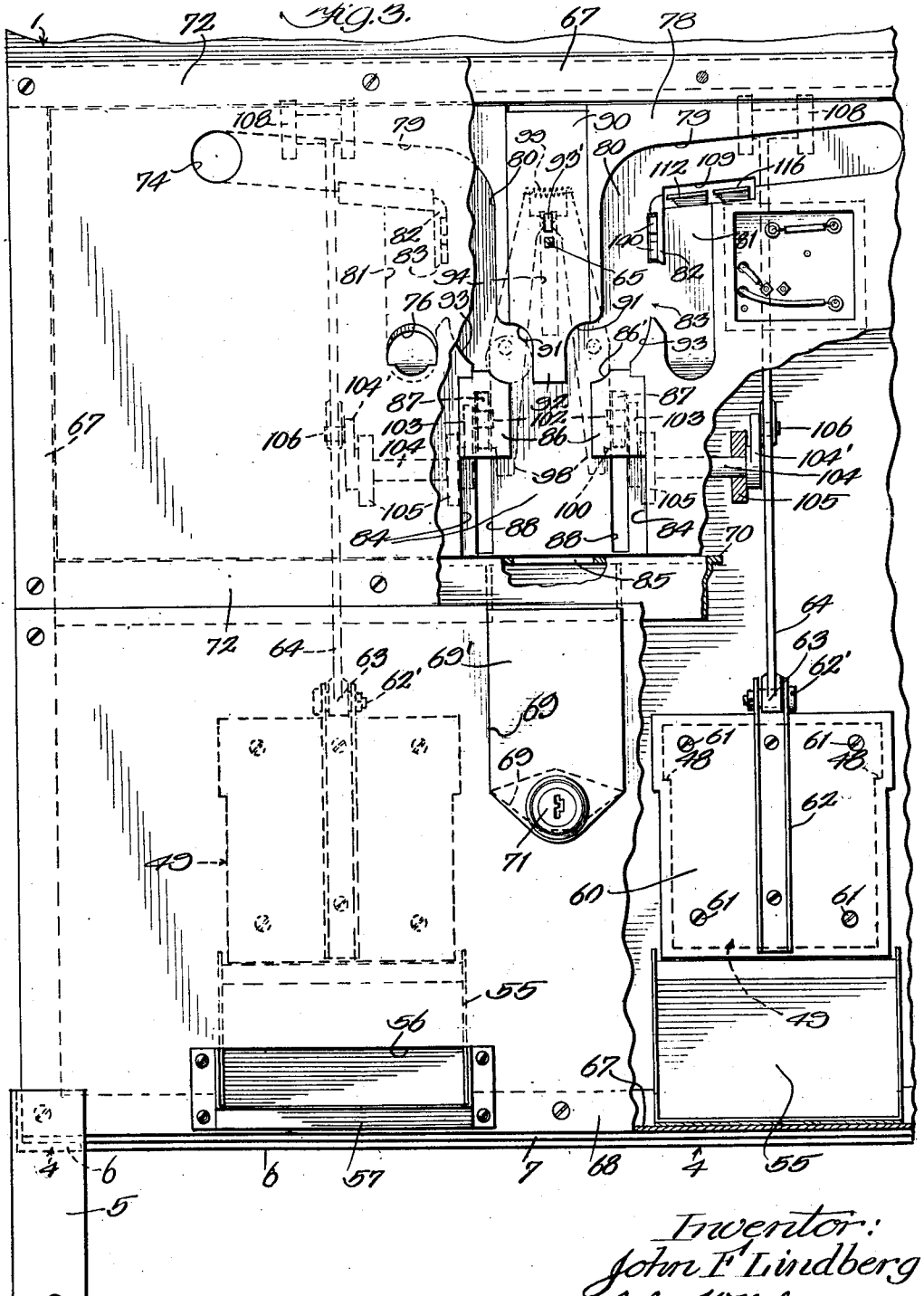
Inventor:
John F. Lindberg
By John H. Nelson
Atty.

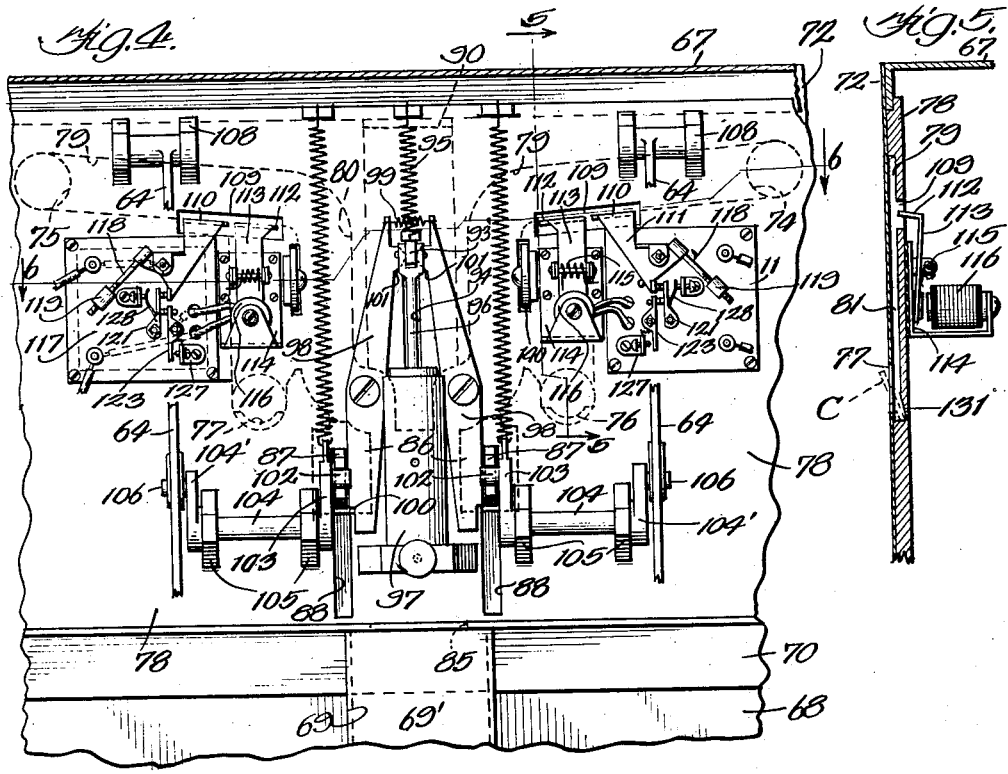

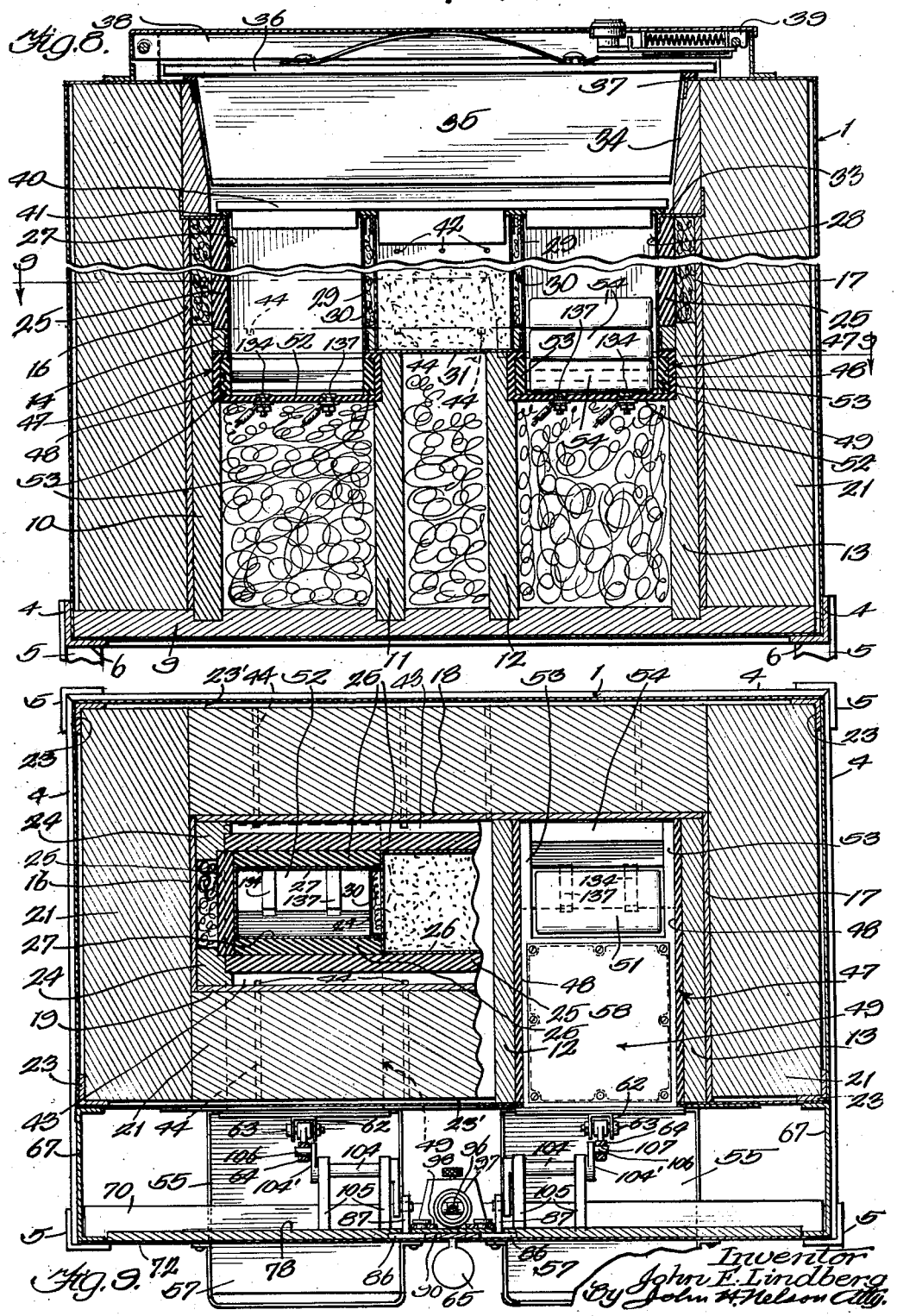

Patented Mar. 6, 1934

1,950,361

UNITED STATES PATENT OFFICE 1,950,361

VENDING MACHINE

John F. Lindberg, Chicago, Ill., assignor to Orris R. Martin, Chicago, Ill.

Application September 8, 1931, Serial No. 561,656

3 Claims. (Cl. 62—91.5)

This invention relates to improvements in vending machines, more especially for refrigerated articles, such as packages of ice cream bars and the like wherein the bars or bricks may be stored in the machine with a refrigerant such as carbon dioxide or "dry ice", and removed by insertion of a coin.

Objects of the invention are to provide in such a machine, refrigerated magazines wherein the bricks may be stored and maintained at an even temperature suitable for being handled by the coin controlled delivering mechanism; to provide efficient refrigerating means which will not require too frequent recharging and wherein a refrigerant of extremely low temperature may be employed and the bricks kept at a temperature near freezing or suitable therefor; to provide such a machine wherein the bricks retain their uniform shape for appearance and in order that the machine will function properly.

Other objects and advantages will become apparent in the following description, with reference to the accompanying drawings, in which an illustrative embodiment of the invention is shown.

Fig. 1 is a perspective view of the vending machine.

Fig. 2 is a central cross section of the machine, taken substantially on the line 2—2 of Fig. 1.

Fig. 3 is an enlarged front elevation of the operating mechanism portion of the machine, with portion of the front wall broken away and portion shown in section.

Fig. 4 is a sectional view showing the operating mechanism, looking from the inside and taken substantially on the line 4—4 of Fig. 2.

Fig. 5 is a section on the line 5—5 of Fig. 4.

Fig. 6 is a sectional view taken substantially on the line 6—6 of Fig. 4.

Fig. 7 is a diagrammatic view of the coin slot mechanism.

Fig. 8 is a vertical section taken on the line 8—8 of Fig. 2, with the intermediate portions broken out.

Fig. 9 is a horizontal section on the line 9—9 of Fig. 8.

Fig. 10 is an enlargement of the refrigerator and magazine walls as shown in the left hand side of Fig. 9.

The machine comprises a rectangular sheet metal housing 1 which is supported on a stand 2 composed of a horizontally disposed angle iron frame 3 consisting of angle irons 4, along the two sides and rear, to which the legs 5 are welded. The horizontal flanges 6, of the angles 4 project inwardly to support the housing 1; and extending across between the side angle members is a bar 7 which supports the operating mechanism housing 8, which is secured to the lower front portion of the housing 1.

The bottom of the housing 1 is covered with a wooden flooring 9 on which is supported, by the boards 10, 11, 12, and 13, set on edge, a horizontal wooden frame 14 which is spaced from the bottom and also the two sides and rear walls of the housing; and extending upward from the frame 14 is a rectangular air shaft which is inclosed by the wooden wall boards 16, 17, 18, and 19, the boards 16, 17, and 18, at the sides and the rear being extended down to the bottom flooring 9, as shown in Fig. 8, and Fig. 2, thus forming an outlet compartment 20 below the frame 14, in the lower portion of the housing. The spaces around the walls of the air shaft are filled with blocks 21 of a specially prepared heat insulating material, which are slightly spaced from the walls of the housing by means of vertical angle members 23 set in the corner of the housing.

In the corners of the air shaft, provided vertically, are disposed wooden posts 24 which are suitably grooved to support slabs 25 of insulating material in spaced relation with the walls of the shaft, which slabs serve to support the rectangular metal tube 26 which forms the chamber for the refrigerant, such as "dry ice", and the rectangular machine tubes 27 and 28 comprising magazines for articles to be vended and which are disposed at either side of the central tube 26.

The magazines are constructed so that the walls remote from the refrigerant chamber are in contacting communication therewith, and the wall adjacent the chamber is insulated therefrom so that the interchange of heat will be evenly distributed throughout the magazine. In the construction shown, the walls of the magazines comprise a relatively thick copper sheet which is folded longitudinally into a U section, the legs of which contact with the walls of the refrigerating chamber, as shown in Fig. 10. Then extending across between the ends of the legs and in slightly spaced relation with the wall of the refrigerant chamber is a thin sheet 29 of relatively low conductivity such as iron, the space between the sheet and the wall of the refrigerant chamber filled with insulating material 30.

The magazines extend elongated in cross-section away from the refrigerant chamber for snugly accommodating stacked therein the articles to be vended, such as the elongated ice cream bricks 51. It is because of this formation of the magazines that it is of especial import that the action of transfer of heat from the inner portions of same away and near the refrigerant chamber is uniform in order that the stacked bricks will be evenly refrigerated throughout their length. Thus the weight of the upper bricks of the stack will not distort the shape of the lower bricks which would otherwise cause jamming in the magazine which would result in improper functioning of the vending mechanism later described. In other words, the ends of the bricks in the portion of the magazine away from the refrigerant chamber will not compress any more than the other ends under pressure of the stack.

The thin wall portion 29 of the magazines is detachably assembled with the U shaped portion thereof, whereby a similar wall portion of different thickness may be substituted in regulating the uniformity of transfer of heat from the magazine to the refrigerant chamber during the manufacture of the machine. To this end the wall portion 29 has a channel-way $29^1$ formed at each edge into which the leg portions of the U shaped portion are received and held in frictional contact. The bottom edges of the channel-ways $29^1$ are rounded as at $29^2$ so as to have line contact with the surface of the adjacent wall of the refrigerant chamber, whereby the action of transfer of heat from the magazines to said chamber is modified in controlling the temperature in said magazine in accordance with the condition of the articles contained therein. To lower the temperature in the magazine, the bottom edges $29^2$ of the channel-ways may be flattened in order to have more surface contact with the refrigerant chamber wall so as to increase the action of heat transference.

The construction of the magazine as described is of especial utility when dry ice is employed in the refrigerant chamber, for the reason that in such a compact assemblage it would be impractical for the magazine to have integral contact with the refrigerant chamber because its temperature would be lowered beyond that suitable for such articles as ice cream bricks. Thus also by reason of said construction the effectiveness of the dry ice is prolonged.

At their lower ends, the tubes 26, 27, and 28, extend through and are supported in the frame 14, the lower end of the tube 26 being closed by a metal sheet 31. The upper end of the central shaft terminates below the top of the housing 1, and the top of the shaft is covered by a flanged sheet metal member 33 which is apertured to receive the upper ends of the tubes 26, 27, and 28, as shown in Fig. 8 and Fig. 2. This forms a space 34 for receiving the insulating plug portion 35 of the cover 36 for the hand hole 37 in the top of the housing. When the magazines and refrigerating chambers are filled, the cover may be locked in place in any suitable manner, as by the bar 38 which is hinged at one end to the top of the housing, and is secured at the other end by a spring operated catch 39. For sealing the upper ends of the tubes, an inner cover 40 may be provided, which has a sealing gasket 41 and fits snugly into the ends of the tubes.

As described above, the angles 23 serve to space the insulating blocks 21 from the walls of the housing, and the gases from the refrigerant are caused to flow out through these spaces formed by angles 23 to carry away the heat that may penetrate through the housing walls. This is accomplished by providing small passages 42 at the top of the refrigerating chamber which lead through the walls of the tube 26 and the adjacent insulating material to the spaces 43 inside the walls of the central shaft. These cool gases then flow downward in these spaces, and then out through channels 44, cut in the surfaces of the wooden frame member 14, up through spaces 23, and out through vents 46 provided near the top of the housing. In this way the heat penetrating in through the walls is taken up by the gases and carried out.

Underneath the lower end of each magazine is mounted a discharge chute 47. The chute is rectangular in section and projects laterally through the front wall of the housing 1, opening into the interior of the housing 8, as shown in Fig. 2 and Fig. 9. The upper portion of the chute is enlarged at the sides to provide guideways 48, in which the drawer 49 is slidably supported and the bottom 50, of the chute is inclined downwardly and outwardly from a line somewhat in front of the middle of the magazine so that the stack of ice cream bricks 51, 51 are supported on the rear horizontal portion 52 of the bottom wall of the chute.

The chute and the drawer are both of a material such as a phenol condensate, which is impervious to the moisture which may collect at the bottom of the magazine, and therefore the two members are not likely to become stuck together due to expansion caused by absorption of moisture, or from collection of frost on the outside as this material is a very low conductor of heat.

The drawer is molded in a wedge shape to conform to the outer portion of the chute, so as to completely fill and thus seal the end of the chute. The drawer terminates just in front of the bottom brick 51, when the drawer is shoved in, and is provided with rearwardly extending rail portions 53, at each side, which support an integrally cast cross member or pusher 54 behind the bottom brick. The pusher bar 54 is inclined forwardly, and the rear portion thereof extends horizontally at about one half the height of the brick, as best shown in Fig. 2. Therefore when the drawer is pulled forward, the bottom brick is pushed out from under the stack and onto the inclined bottom portion 50 of the chute, and will slide out underneath the drawer onto the inclined trough 55, extending from the wall of the housing 1, which directs the brick out through a discharge aperture 56 in the lower portion of the front wall of the housing 8, into a pocket member 57, mounted on the front housing 8.

The drawer is molded hollow, and the core space is covered by a plate 58, and on the front end of the drawer is secured a gasket 59 of soft material which is held in place by a metal plate 60 which is secured to the end of the drawer by screws 61. The gasket 59 projects beyond the end of the drawer at all sides thereof and provides a seal against the surface of the housing wall. An upwardly extending bracket 62 is secured to the middle of the plate 60, and supports a pin 62' which is engaged by the forked end 63 of the upwardly extending operating lever 64 by which the drawer is moved in and out.

The lever 64 is operated by means of a handle 65 which projects through a slot 66 in the front wall of the housing 8, the connection from the handle to the lever 64 being effected by means controlled by the insertion of a coin. The mechanism will now be described in detail.

The housing 8 comprises a rectangular, channel section frame 67 which is secured to the front of the housing 1, and in front, the lower portion is covered by a plate 68 which is removably secured to the flanges of the frame member 67, the discharge apertures 56 being provided in the lower portion of the plate, and a suitable aperture 69 being provided in the middle of the upper portion for the coin box 69'. An angle frame member 70 is fixedly mounted on the flange of the side portion of the frame 67, and extends across the housing at the upper edge of the plate 69, and the coin box hooks under the angle 70 and is secured at the lower end to the plate 68 by means of a key operated lock 71.

The upper portion of the front of the housing 8 is covered by a removable plate or panel 72, and lower edge of which is inserted between the lip 73, formed on the coin box, and the angle 70, so that the panel cannot be removed without unlocking and removing the coin box. The slot 66 is formed in the panel, and also apertures 74 and 75, corresponding to the magazines 27 and 28, for the insertion of the coins, and discharge apertures 76 and 77 for returning slugs, and coins when machine is empty.

On the back of the panel 72 is mounted a cast plate 78, the face of which is channeled to provide two sets of passages for the coins, the channels being covered by the panel when the plate is in position to form passages comprising the downwardly sloping coin chutes 79 which communicate with each of the coin insertion apertures 74 and 75. The chutes 79 extend inwardly and terminate in downwardly extending passages 80 and 81 which are separated by the short wall portion 82 and are in communication below the wall portion through the passage 83.

The passages 80 are in communication with a central coin discharge chamber 84, from which a coin, after it has served its function, drops through a slot 85, through the flange of the angle 70, into the coin box 69. The passages 81 are for returning defective coins or slugs, and communicate at their lower ends with the apertures 76 and 77.

In each side of the chamber 84 is mounted a vertically reciprocable slide 86, each of which is provided with a stem or post 87 extending through a slot 88 in the plate 78. In the plate above the chamber 84 and between the vertical passages 80, is mounted a vertically reciprocable central slide 90 which is rigidly connected to the handle 65. The central slide 90 has a shoulder 91 at each side of a tongue portion 92, and when a coin is passed down through the channel 80, the coin is deflected by the curved wall portion 93 and strikes against the tongue and lodges in the notch 86' provided in the upper inner corner of the slide 86. Then when the handle is pressed to move the central slide downward, the coin is gripped between the shoulder of the central slide and the notch in the slide 86 on which the coin has lodged, so that the manually operated central slide is thereby connected to the slide 86 for operating the same. Normally the central slide passes between the slides 86 without engaging the same.

The central slide is provided with a post 93' which projects rearwardly through a slot 94 in the plate, and to the post is connected a spring 95, for drawing the slide upwardly, and a dashpot plunger 96 which operates in a cylinder 97, mounted on the back of the plate 78, to prevent a violent manipulation of the handle which might damage the mechanism.

A lever 98 for locking the corresponding slide 86 in its lowermost position, to allow the coin to drop out, is pivotally mounted on the back of the plate 78 at each side of the slot 94. The levers 98 are connected by a spring 99 at the upper ends thereof which urges the lower ends of the levers into contact with the stems 87 so that, in the operated position of the slides 86, the stems become engaged in the notches 100, provided in the lower ends of the levers. In the upper position of the central slide the post 93 engages between the lugs 101, provided on the inner sides of the upper ends of the levers 98, to draw the lower ends of the levers inwardly and release the slide 86 which has been operated in the downward movement of the slide 90.

The inner ends of the stems 87, secured to the slides 86, are bifurcated to engage a crank pin 102 by which each slide is connected for operating the drawer of the corresponding magazine 27 or 28. The crank pins are mounted on the free ends of levers 103 which are fixedly secured to shafts 104 which are rotatably mounted in pairs of lugs 105, cast on the plate 78. On the outer ends of the shafts 104 are rigidly secured crank arms 104' having pins 106 which engage in a slot 107 formed in the corresponding drawer operating lever 64. The levers 64 are pivoted at their upper ends to lugs 108, cast on the plate 78; and therefore, when one of the slides 86 is depressed the lower end of the corresponding lever 64 is swung outwardly to pull out its drawer and discharge a brick from the machine.

The lower portion of each coin chute 79 is intercepted by an aperture 109, in the plate 72, and the platform or shelf 110 of the weighing lever 111 and the shelf 112 of the coin passing lever 113 function through said aperture to pass good coins along to connect the operating slide 90 to one of the slides 86, and to reject imperfect coins or slugs by allowing the same to drop down into the channel 81. The lever 113 is pivotally mounted on a plate 114 which is insulatingly mounted on the back of the cast plate 78, and the lever is normally swung back by the spring 115 so that the shelf 112 is withdrawn to allow a coin passing along in the chute 79 to drop down the channel 81. When a coin of the proper weight passes over the platform 110 the platform is depressed to a predetermined position at which it causes the energization of the magnet 116 which attracts the lower end of the lever 113 and rotates the lever to swing the shelf 112 into position to form a continuation of the bottom of the chute 79 and pass the coin along to the end of the chute where it falls down the passage 80 and into position between the cooperating portion of the slides 90 and 86.

The energization of the magnet is accomplished as follows. The weighing lever 111 is rotatably mounted on the back of a plate 117, screwed to the frame plate 78, and is provided with an arm 118 on which is threaded a weight 119 for balancing the lever. The lever is balanced so that a coin of the correct weight will move the lever to a predetermined position where it will make contact at 120 with a switch lever 121, and if the coin is over weight the lever 111 will be rotated beyond said position to move the lever 121 away from a normally closed contact at 122 with a switch lever 123. The lever 123 is centrally pivoted at 124 to the plate 117, and is normally in contact with a stop pin 125, mounted on the plate 117, and is urged away from the pin 125 by a spring 126, connected to a bracket piece 127 rigidly mounted on the plate 117. The lever 121 is pivotally mounted, at its lower end, on said plate 117 and is urged into contact with the lever 123 to hold the same against the stop 125 by a leaf spring 128. The movement of the lever 123 away from the stop 125 is limited by the screw 129, threaded through the member 127, so that the contact 122 will be maintained at said position of the weighing lever 111, and broken when the lever is moved beyond the position.

Said levers 111, 121, and 123 are insulated, as will be understood, so that when both contacts 120 and 122 are closed for a short time the magnet 116 will be energized from the source of power 130, through the wire 131, leading from the source 130 to the magnet, the wire 132 connecting from the magnet to the arm 123, contact 122, arm 121, contact 126, wire 133 to a contact plate 134, mounted in the bottom portion 52 of the chute 47 underneath the stack of bricks 51, through the conductive covering 136 of the bottom brick, to a similarly mounted plate 137, in spaced relation with the plate 134, through the wire 138 to the opposite polarity of the source 130.

If the coin is over weight the contact at 120 will be made only momentarily, and the contact at 122 will be broken before the magnet is sufficiently energized to move the lever 113 to pass the coin. From the above description, it is apparent that the magnet energizing circuit, just described, must be completed by the article in the magazine, therefore when the magazine corresponding to the slot 74 or 75 in which the coin has been inserted is entirely empty, the magnet 116 cannot be energized and all coins will be returned to the apertures 76 or 77, where they can be removed by picking the coin out of the pocket 131 provided in the bottom of the passage 80, as best shown in Fig. 5 where a coin C is indicated in broken lines.

Provision is also made for returning slugs which are of magnetic material. In the wall portion 82 is mounted a permanent magnet 140 having its poles exposed in the side of the passage 80; and when a slug is passed as being of the correct weight, and drops down the passage 80, it is attracted against the magnet and adheres thereto so that it will swing around the lower edge of the magnet through the communicating aperture 83 and drop into the bottom of the passage 81.

Having thus described my invention, I claim:

1. In a vending machine for refrigerated articles, a storage chamber and a refrigerant chamber in parallel relation and arranged side by side, the walls of the storage chamber extending away from the refrigerant chamber being of highly heat conducting material and having edges in cooperative butting contact with the adjacent wall of the refrigerant chamber for controlling transfer of heat, and the wall of the storage chamber adjacent the refrigerant chamber being of low heat conducting material and partially insulated from said chamber so that the interchange of heat is distributed evenly throughout the storage chamber.

2. In a vending machine for refrigerated articles, a storage chamber and a refrigerant chamber in parallel relation and arranged side by side, the walls of the storage chamber extending away from the refrigerant chamber being of highly heat conducting material, means for controlling heat transferring contact between said walls and the refrigerant chamber, and the wall of the storage chamber adjacent the refrigerant chamber being thinner than the aforesaid walls so as to be of low heat conducting capacity and being partially insulated from the refrigerant chamber whereby the interchange of heat is distributed more evenly throughout the storage chamber.

3. In a vending machine for refrigerated articles, a storage chamber and a refrigerant chamber in parallel relation and arranged side by side, the walls of the storage chamber extending away from the refrigerant chamber being of highly heat conducting material and having edges in cooperative butting contact with the adjacent wall of the refrigerant chamber for controlling transfer of heat, and the wall of the storage chamber adjacent the refrigerant chamber being of low heat conducting material and thinner than the aforesaid walls and said wall being partially insulated from the refrigerant chamber so that the interchange of heat is distributed more evenly throughout the storage chamber.

JOHN F. LINDBERG.